(12) United States Patent
Su (10) Patent No.: US 8,884,593 B2
(45) Date of Patent: Nov. 11, 2014

(54) VOLTAGE CONVERTER FOR PROVIDING A POSITIVE AND A NEGATIVE VOLTAGE

(75) Inventor: Chung-Hsin Su, Jhubei (TW)

(73) Assignee: Sitronix Technology Corp., Hsinchu (TW)

( * ) Notice: Subject to any disclaimer, the term of this patent is extended or adjusted under 35 U.S.C. 154(b) by 114 days.

(21) Appl. No.: 13/542,764

(22) Filed: Jul. 6, 2012

(65) Prior Publication Data

US 2013/0009618 A1 Jan. 10, 2013

(30) Foreign Application Priority Data

Jul. 7, 2011 (TW) .............................. 100123976 A (51) Int. Cl.
G05F 1/00 (2006.01)
H02M 3/158 (2006.01)
H02M 1/00 (2006.01)

(52) U.S. Cl.
CPC ........ H02M 3/158 (2013.01); *H02M 2001/009* (2013.01)
USPC ............................ 323/275; 323/225; 323/277

(58) Field of Classification Search
CPC .... H02M 3/158; H02M 2001/009; G05F 1/10
USPC ................. 323/265–277, 222–225, 282–286; 363/59–61; 307/110; 327/536–538
See application file for complete search history.

(56) References Cited

U.S. PATENT DOCUMENTS

| | | | | |
|---|---|---|---|---|
| 5,751,139 A | * | 5/1998 | Jordan et al. ................. | 323/222 |
| 6,075,295 A | * | 6/2000 | Li ................................... | 307/39 |
| 6,262,860 B1 | * | 7/2001 | Ishida ......................... | 360/78.05 |
| 6,437,545 B2 | * | 8/2002 | Sluijs ............................. | 323/222 |
| 6,600,300 B2 | * | 7/2003 | Groeneveld et al. .......... | 323/282 |
| 6,636,022 B2 | * | 10/2003 | Sluijs ............................. | 323/222 |
| 6,900,620 B2 | * | 5/2005 | Nishimori et al. ............. | 323/222 |
| 7,256,568 B2 | * | 8/2007 | Lam et al. ..................... | 323/222 |
| 7,378,823 B2 | * | 5/2008 | Yamanaka et al. ............ | 323/267 |
| 7,432,614 B2 | * | 10/2008 | Ma et al. .......................... | 307/31 |
| 7,466,114 B2 | * | 12/2008 | Derckx et al. ................. | 323/272 |
| 7,583,066 B2 | * | 9/2009 | Tolle et al. ..................... | 323/267 |
| 7,684,222 B2 | * | 3/2010 | Paatero ......................... | 363/132 |
| 7,723,965 B2 | * | 5/2010 | Lesso et al. ................... | 323/225 |
| 8,115,460 B2 | * | 2/2012 | Kalechshtein ................ | 323/235 |
| 8,564,155 B2 | * | 10/2013 | Wibben .......................... | 307/31 |

(Continued)

FOREIGN PATENT DOCUMENTS

CN 101552549 A 10/2009
TW 201034366 A 9/2010

*Primary Examiner* — Timothy J Dole
*Assistant Examiner* — Yusef Ahmed
(74) *Attorney, Agent, or Firm* — Rosenberg, Klein & Lee (57) ABSTRACT

The present invention relates to a voltage converter, which uses an inductor coupled between a power supply and a reference voltage for providing a supply voltage. A plurality of output capacitors are coupled to both sides of the inductor, respectively, and receive the supply voltage for producing a positive voltage and a negative voltage. A plurality of output switches are coupled to both sides of the inductor, respectively, and control the inductor to charge the plurality of output capacitors. A feedback control circuit produces a control signal according to the positive and negative voltages for controlling the plurality of output switches. Thereby, the present invention can produce positive and negative voltage by means of the inductor. Accordingly, the voltage converter according to the present invention avoids usage of multiple inductors and capacitors in producing voltages with different levels, and thus reducing the circuit area as well as the manufacturing cost.

9 Claims, 11 Drawing Sheets

(56) References Cited

U.S. PATENT DOCUMENTS

| | | |
|---|---|---|
| 8,624,429 B2 * | 1/2014 | Jing et al. .................. 307/18 |
| 2004/0135562 A1 | 7/2004 | Oden |
| 2004/0141341 A1 * | 7/2004 | Higashitani et al. ............ 363/59 |
| 2005/0110471 A1 * | 5/2005 | Mayega et al. ............... 323/267 |
| 2006/0176031 A1 | 8/2006 | Forman et al. |
| 2008/0055946 A1 | 3/2008 | Lesso et al. |
| 2009/0218996 A1 * | 9/2009 | Kaplish .................. 323/272 |
| 2010/0194359 A1 * | 8/2010 | Notman .................. 323/267 |
| 2010/0231186 A1 | 9/2010 | Chen et al. |
| 2011/0273151 A1 * | 11/2011 | Lesso et al. ................. 323/271 |
| 2012/0274134 A1 * | 11/2012 | Gasparini et al. ............... 307/31 |
| 2012/0286748 A1 * | 11/2012 | Chen et al. .................. 323/271 |

* cited by examiner

VOLTAGE CONVERTER FOR PROVIDING A POSITIVE AND A NEGATIVE VOLTAGE

FIELD OF THE INVENTION

The present invention relates generally to voltage converter, and particularly to a voltage converter capable of providing a positive and a negative voltage simultaneously.

BACKGROUND OF THE INVENTION

Voltage regulation is applied for providing supply voltages to various microelectronic devices such as digital ICs, semiconductor memories, display modules, hard disk drivers, RF circuits, microprocessors, digital signal processors, and analog ICs. In particular, voltage regulation is also applied to applications using batteries such as mobile phones, notebook computers, and consumer products.

The battery or DC input voltage in electronic products has to be raised gradually to a higher DC voltage or lowered gradually to a lower DC voltage. The regulating devices are named DC-to-DC converters. When the voltage of a battery is greater than the expected loading voltage, a voltage down-converter is used for lowering the voltage of the battery. The voltage down-converter can include an inductive switching regulator, a capacitive charge pump, and a linear regulator. On the contrary, when the voltage of a battery is smaller than the expected loading voltage, a voltage up-converter is used. The voltage up-converter can include an inductive switching regulator or a capacitive charge pump.

In addition, the panels of a thin-film-transistor liquid crystal display (TFT-LCD) and an active-matrix. organic light-emitting diode (AMOLED) need multiple voltage levels. Because the driving voltages of a TFT-LCD are usually provided by capacitive charge pumps, multiple capacitors are required. On the other hand, the driving voltages of an AMOLED require multiple inductors and capacitors. Consequently, the circuit area, and hence the costs, are increased.

Accordingly, the present invention provides a novel voltage converter, which avoids using multiple inductors or capacitors for producing multiple voltages with different levels. Thereby, the increase in circuit area, and hence in cost, can be prevented.

SUMMARY

An objective of the present invention is to provide a voltage converter, which uses an inductor to produce positive and negative voltages. Thereby, usage of multiple inductors and capacitors in producing voltages with different levels can be avoided, and thus reducing the circuit area as well as the manufacturing cost.

Another objective of the present invention is to provide a voltage converter, which controls charging of an inductor to a plurality of output capacitors by means of a feedback control circuit, and hence controlling the voltage converter to output positive and negative voltages accurately. Thus, the accuracy is enhanced.

The voltage converter according to the present invention comprises an inductor, a plurality of output capacitors, a plurality of output switches, and a feedback control circuit. The inductor is coupled between a power supply and a reference voltage for providing a supply voltage. The plurality of output capacitors are coupled to both sides of the inductor, respectively, and receive the supply voltage for producing a positive voltage and a negative voltage. The plurality of output switches are coupled to both sides of the inductor, respectively, and control charging of the inductor to the plurality of output capacitors. The feedback control circuit produces a control signal according to the positive and negative voltages for controlling the plurality of output switches. Thereby, by using the inductor, the present can produce positive and negative voltages. Accordingly, the voltage converter according to the present invention avoids usage of multiple inductors and capacitors in producing voltages with different levels, and thus reducing the circuit area as well as the manufacturing cost.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
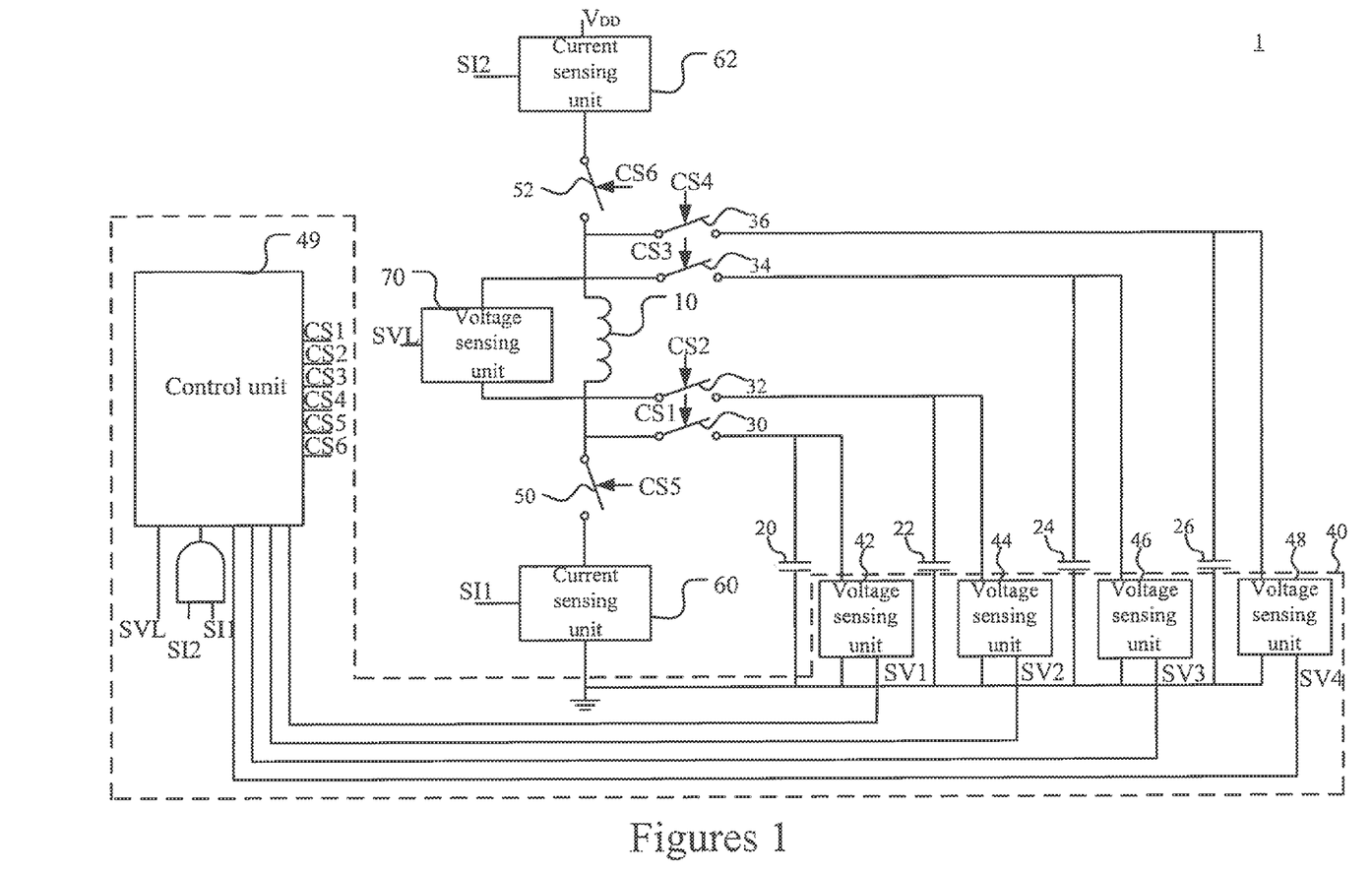
FIG. 1 shows a circuit diagram of the voltage converter according to a preferred embodiment of the present invention.

FIG. 1 shows a circuit diagram of the voltage converter according to a preferred embodiment of the present invention. As shown in the figure, the voltage converter 1 according to the present invention comprises an inductor 10, a plurality of output capacitors 20, 24, 26, a plurality of output switches 30, 32, 34, 36, and a feedback control circuit 40. The inductor 10 is coupled between a power supply $V_{DD}$ and a reference voltage VSS via a first control switch 50 and a second control switch 52, respectively, for providing a supply voltage. The plurality of output capacitors 20, 22, 24, 26 are coupled to both sides of the inductor 10 via the switches 30, 32, 34, 36 and receive the supply voltage for producing positive- and negative-voltage outputs. According to the present embodiment, the plurality of output capacitors 20, 22, 24, 26 are a first output capacitor 20, a second output capacitor 22, a third output capacitor 24, and a fourth output capacitor 26, respectively. The first output capacitor 20 and the second output capacitor 22 are coupled to a terminal of the inductor 10 for producing positive-voltage outputs; the third output capacitor 24 and the fourth output capacitor 26 are coupled to the other terminal of the inductor 10 for producing negative-voltage outputs.

The plurality of output switches 30, 32, 34, 36 are coupled to both sides of the inductor 10, respectively, and control the inductor 10 to charge the plurality of output capacitors 20, 22, 24, 26. The feedback control circuit 40 produces a control signal according to the positive and negative voltages for controlling the plurality of switches 30, 32, 34, 36. According to the present embodiment, the plurality of switches 30, 32, 34, 36 are a first output switch 30, a second output switch 32, a third output switch 34, and a fourth output switch 36. The first and second output switches 30, 32 are coupled to one side of the inductor 10; the first output switch 30 is coupled between the inductor 10 and the first output capacitor 20; the second output switch 32 is coupled between the inductor 10 and the second output capacitor 22 for controlling the inductor 10 to charge the first and second output capacitors 20, 22. The third output switch 34 and the fourth output switch 34, 26 are coupled to the other side of the inductor 10; the third output switch 34 is coupled between the inductor 10 and the third output capacitor 26 for controlling the inductor 10 to charge the third and fourth output capacitors 24, 26. The first and second output capacitors 20, 22 are used for outputting positive voltages with different voltage levels for subsequent circuits, while the third and fourth output capacitors 24, 26 are used for outputting negative voltages with different voltage levels for subsequent circuits. It is known from above that the present invention can produce positive and negative voltage by means of the inductor 10. Usage of multiple inductors or capacitors can be avoided for producing voltage with different levels. Accordingly, the circuit area, and hence the manufacturing cost, can be reduced.

In addition, the feedback control circuit 40 comprises a plurality of voltage sensing units 42, 44, 46, 48 and control unit 49. The plurality of voltage sensing units 42, 44, 46, 48 are coupled to the plurality of output capacitors 20, 22, 24, 26, and produce a voltage sensing signal according the positive and negative voltages produced by the plurality of output capacitors 20, 22, 24, 26. The plurality of voltage sensing units 42, 44, 46, 48 are a first voltage sensing unit 42, a second voltage sensing unit 44, a third voltage sensing unit 46, and a fourth voltage sensing unit 48, respectively. The first and second voltage sensing units 42, 44 are coupled to the positive voltages of the first and second output capacitors 20, 22, respectively, and produce a first voltage sensing signal SV1 and a second voltage sensing signal SV2, respectively. Likewise, the third and fourth voltage sensing units 46, 48 are coupled to the negative voltages of the third and fourth output capacitors 24, 26, respectively, and produce a third voltage sensing signal SV3 and a fourth voltage sensing signal SV4, respectively, The control unit 49 is coupled to the plurality of voltage sensing units 42, 44, 46, 48 and produces a first control signal CS1, a second control signal CS2, a third control signal CS3, and a fourth control signal CS4, respectively, according to the voltage sensing signals SV1, SV2, SV3, SV4 produced by the plurality of voltage sensing units 42, 44, 46, 48 for controlling the first, second third, and fourth output switches 30, 32, 34, 36 and thus controlling the inductor 10 to charge the first, second third, and fourth output capacitors 20, 22, 24, 26.

Besides, the voltage converter 1 according to the present invention further comprises a plurality of control switches 50, 52 and a plurality of current sensing units 60, 62. The plurality of control switches 50, 52 are coupled to both sides of the inductor 10 for controlling the power supply $V_{DD}$ to charge the inductor 10. The plurality of control switches 50, 52 are a first control switch 50 and a second control switch 52. The first control switch 50 is coupled between a reference voltage and the inductor 10 and the second control switch 52 is coupled between a power supply and the inductor 10 for controlling the power supply $V_{DD}$ to charge the inductor 10. The plurality of current sensing units 60, 62 are coupled to the plurality of control switches 50, 52, respectively, for detecting a current of the plurality of control switches 50, 52, producing a first current sensing signal SI1 and a second current sensing signal SI2, respectively, and transmitting the first and second current sensing signals SI1, SI2 to the feedback control circuit 40. The feedback control circuit 40 controls the plurality of control switches 50, 52 according to the current sensing signals produced by the plurality of current sensing units 60, 62, The plurality of current sensing units 60, 62 are a first current sensing unit 60 and a second current sensing unit 62, which are connected in series with the first and second control switches 50, 52, respectively, for detecting the currents passing through the first and second control switches 50, 52 and thereby producing the first and second current sensing signals SI1, SI2. The control unit 49 receives the first and second current sensing signals SI1, SI2 to know the charging status of the power supply $V_{DD}$ on the inductor 10. The control unit 49 also produces a fifth control signal CS5 and a sixth control signal CS6 according to the first and second current sensing signals SI1, SI2 for controlling on/off of the first and second control switches 50, 52.

Moreover, the voltage converter I according to the present invention further comprises a voltage sensing unit 70 coupled on both sides of the inductor 10 for detecting the voltage across the both terminals of the inductor 10 and producing a voltage detecting signal SVL. In other words, the voltage sensing unit 70 can detect the voltage difference between the both terminals of the inductor 10, produce the voltage detecting signal SVL, and transmit the voltage detecting signal SVL to the feedback control circuit 40, The feedback control circuit 40 can know if the inductor 10 has stored energy according to the voltage detecting signal SVL and thus determining to control on/off of the first and second control switches 50, 52, and the first, second, third, and fourth output switches 30, 32, 34, 36.

Furthermore, the control unit 49 according to the present invention controls on/off of the first and second control switches 50, 52, and the first, second, third, and fourth output switches 30, 32, 34, 36 according to the first and second current sensing signals SI1, SI2, the first, second, third, and fourth voltage sensing signals SV1, SV2, SV3, SV4, and the voltage detecting signal SVL. Thereby, the present invention uses the plurality of sensing units to control on/off of the plurality of control switches and the plurality of output switches. It is not required to use an extra clock generator to generate an input clock signal for controlling on/off of the plurality of switches. Thus, the purposes of saving circuit area and hence cost can be achieved.

Figure 2:
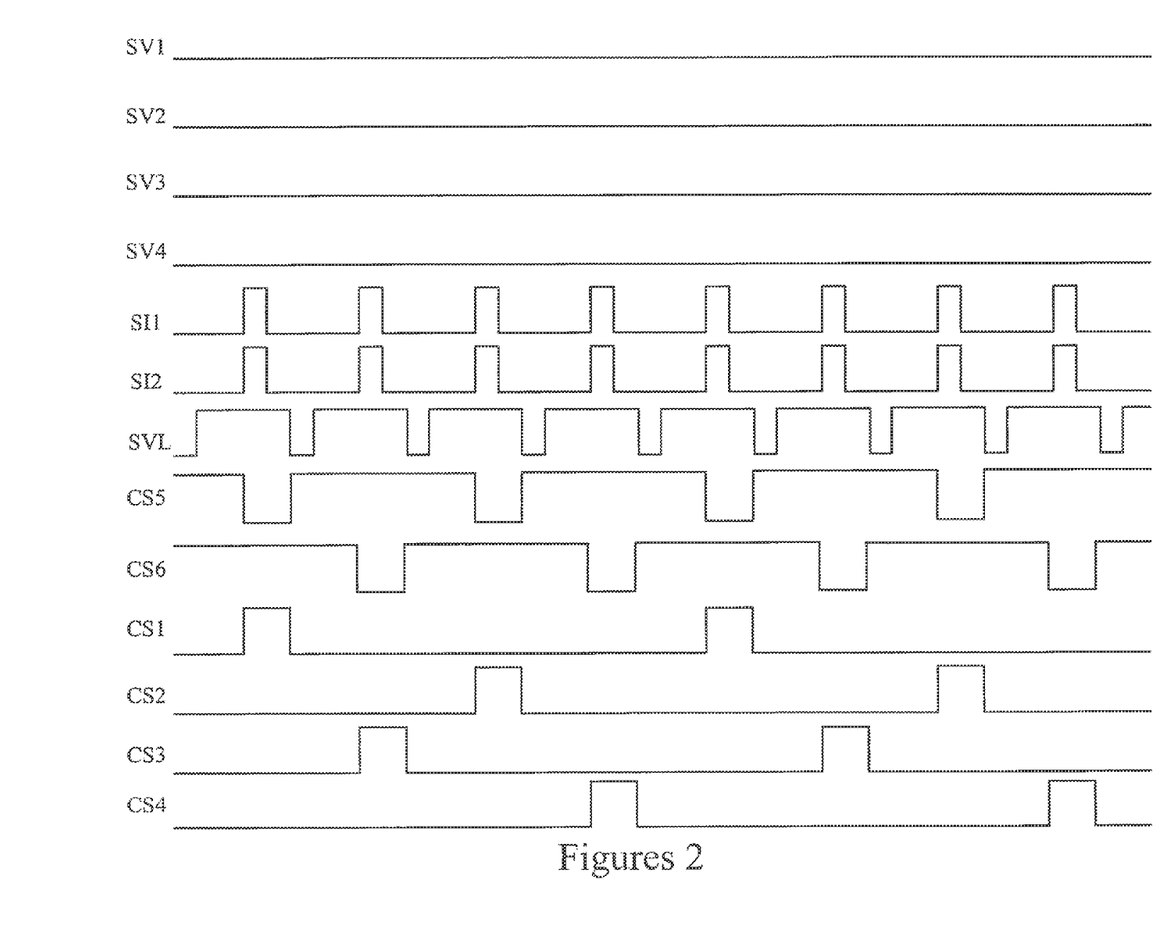
FIG. 2 shows waveforms of the voltage converter capable of outputting two positive and two negative voltages according to an embodiment of the present invention.

FIG. 2 shows waveforms of the voltage converter capable of outputting two positive and two negative voltages according to an embodiment of the present invention, As shown in the figure, the initial state of the voltage converter 1 according to the present invention is to turn on the first and second control switches 50, 52 and make the power supply $V_{DD}$ start to store energy to the inductor 10. When the inductor 10 is filled with energy, the first control switch 50 is cutoff and the second control switch 52 and the first output switch 30 are turned on to charge the first output capacitor 20 by using the energy in the inductor 10. After the energy in the inductor 10 is transferred completely to the first output capacitor 20, the first output switch 30 is cutoff and the first and second control switches 50, 52 are turned on again to store energy to the inductor 10 by using the power supply $V_{DD}$. When the inductor 10 is filled with energy, the second control switch 52 is cutoff and the first control switch 50 and the third output switch 34 are turned on to charge the third output capacitor 24 by using the energy in the inductor 10. After the energy in the inductor 10 is transferred completely to the third output capacitor 24, the third output switch 34 is cutoff and the first and second control switches 50, 52 are turned on again to store energy to the inductor 10 by using the power supply $V_{DD}$. When the inductor 10 is filled with energy, the first control switch 50 is cutoff and the second control switch 52 and the second output switch 32 are turned on to charge the second output capacitor 22 by using the energy in the inductor 10. After the energy in the inductor 10 is transferred completely to the second output capacitor 22, the second output switch 32 is cutoff, and the first and second control switches 50, 52 are turned on again to store energy to the inductor 10 by using the power supply $V_{DD}$. When the inductor 10 is filled with energy, the second control switch 52 is cutoff and the first control switch 50 and the fourth output switch 36 are turned on to charge the fourth output capacitor 26 by using the energy in the inductor 10. After the energy in the inductor 10 is transferred completely to the fourth output capacitor 26, the fourth output switch 36 is cutoff. This cycle is repeated for outputting positive and negative voltages with different levels.

Figure 3:
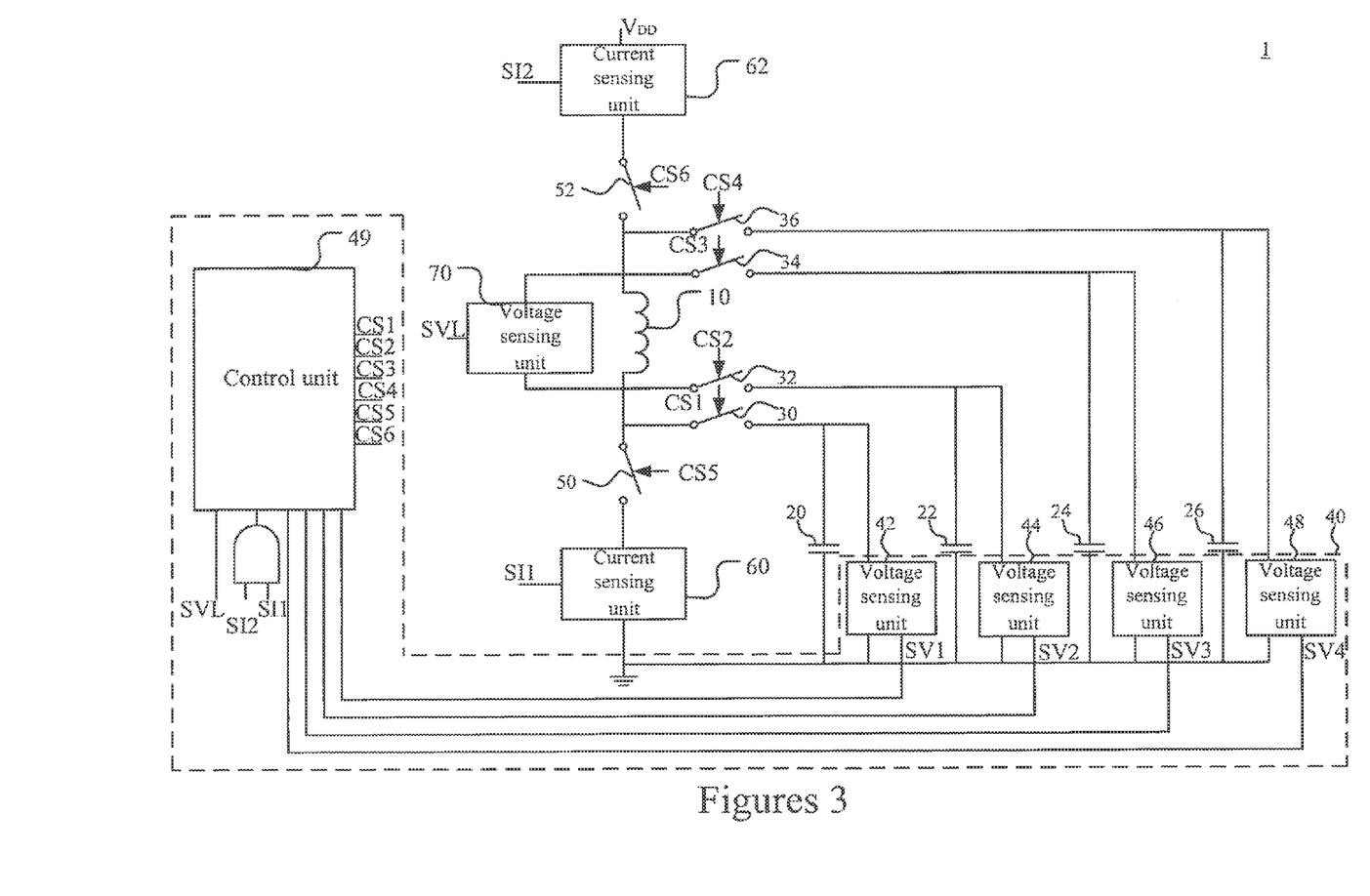
FIG. 3 shows a circuit diagram of the voltage converter when the first output voltage has reached the set value while the others have not according to the present invention.
Figure 4:
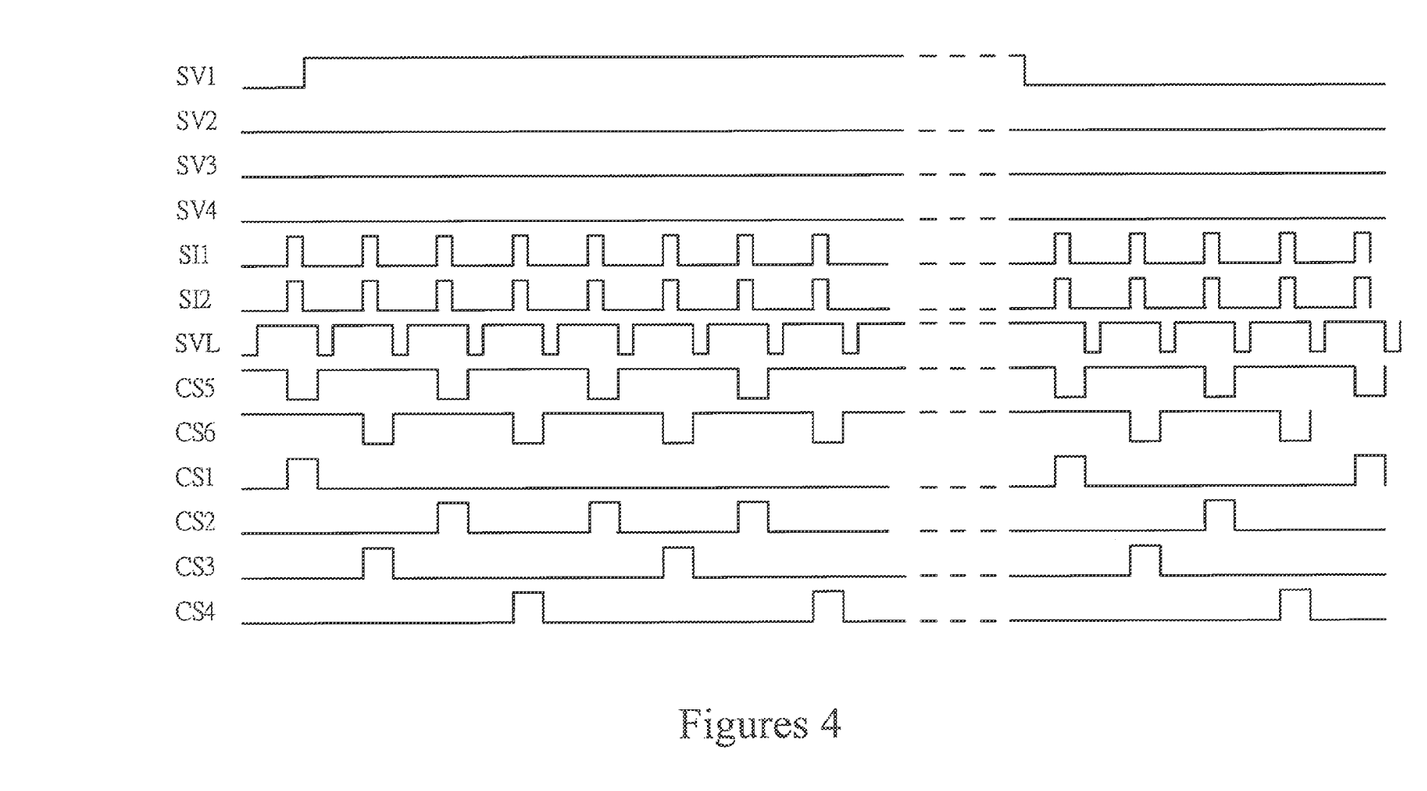
FIG. 4 shows waveforms of FIG. 3 according a the present invention.
Figure 5:
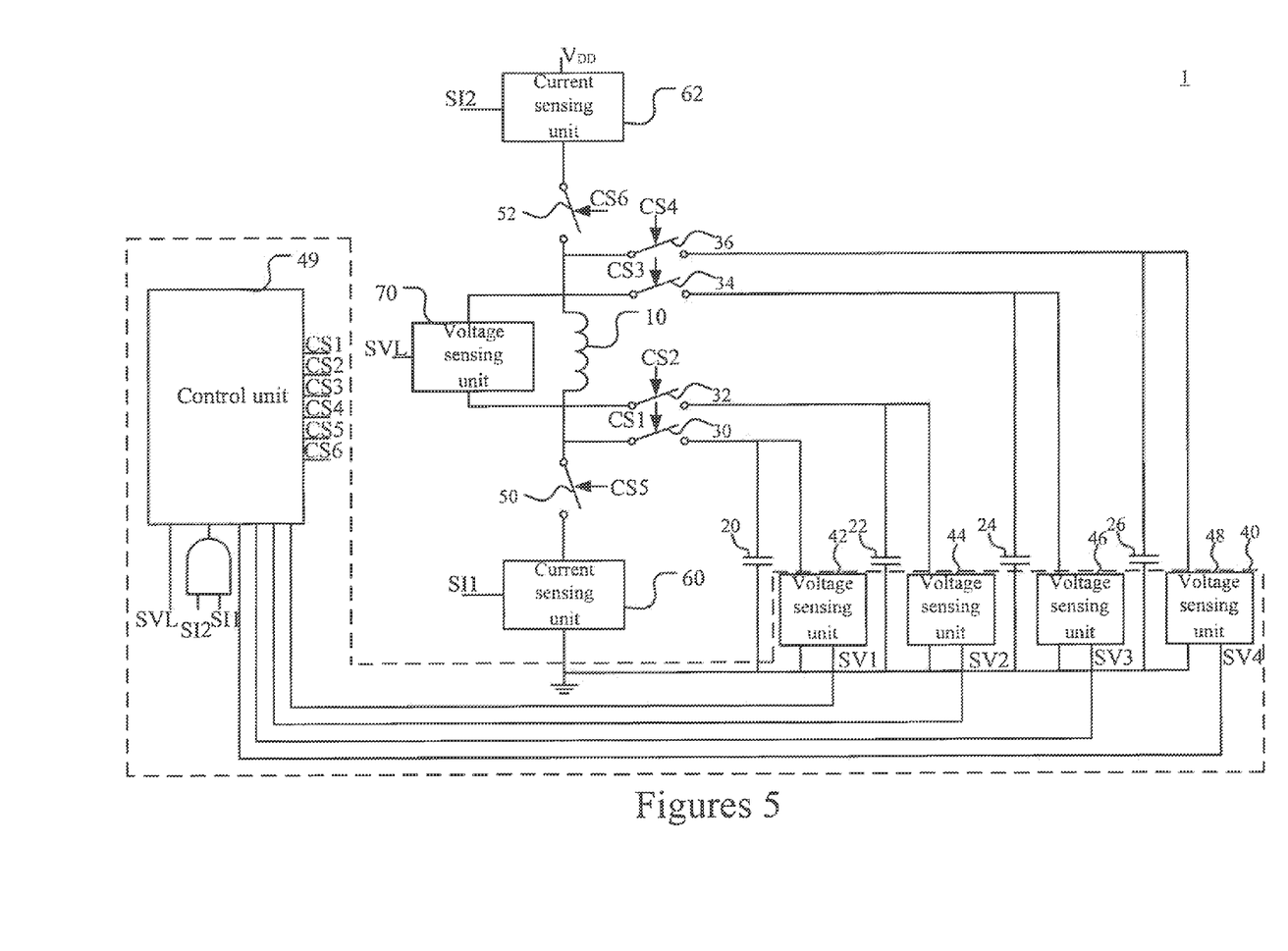
FIG. 5 shows a circuit diagram of the voltage converter when the first and the third output voltages have reached the set value while the others have not according to the present invention.
Figure 6:
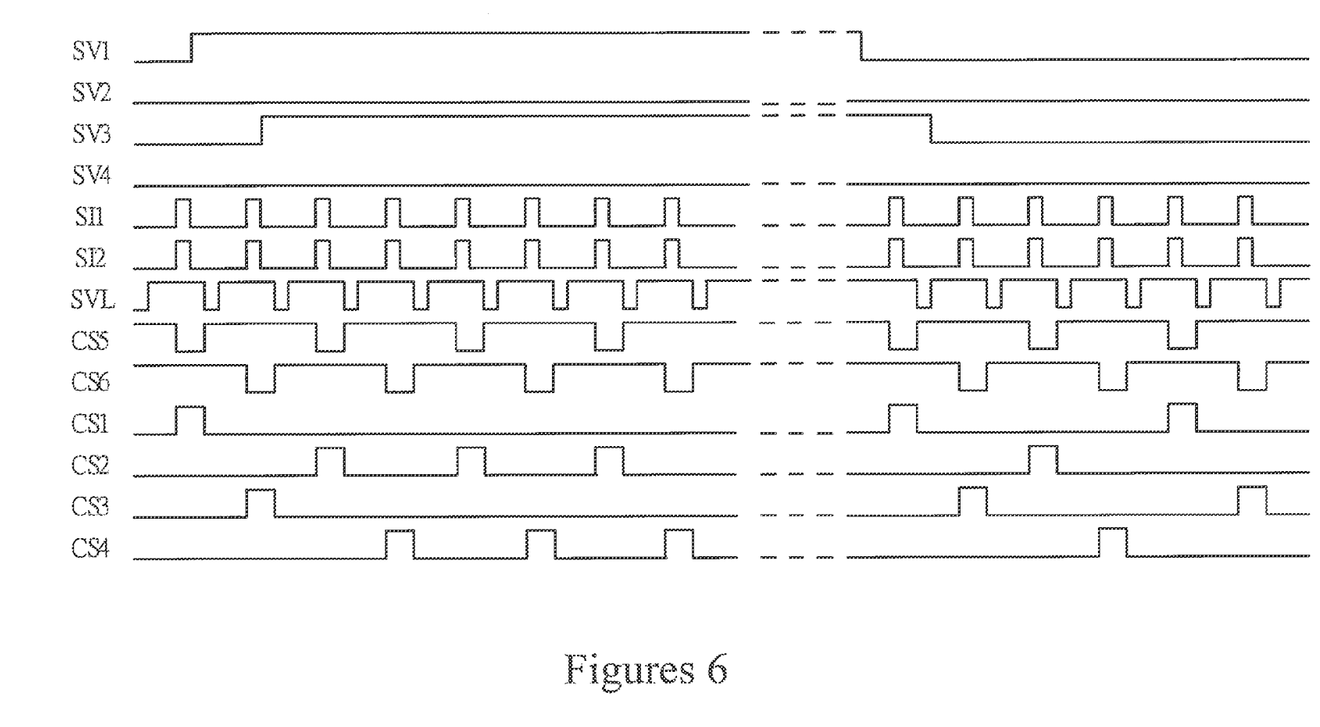
FIG. 6 shows waveforms of FIG. 5 according a the present invention.

FIG. 3 and FIG. 4 show a circuit diagram and waveforms of the voltage converter when the first output voltage has reached the set value while the others have not according to the present invention. As shown in the figures, the difference between the present embodiment and the previous one is that according to the present embodiment, after the first voltage sensing unit 42 detects that the first output voltage has reached the set value and produces the first voltage sensing signal SV1 and the control unit 49 receives the first voltage sensing signal SV1, the first output switch 30 is cutoff and the first and second control switches 50, 52 are turned on again to charge the inductor 10 again using the power supply $V_{DD}$. When the inductor 10 is filled with energy, the second control switch 52 is cutoff and the first control switch 50 and the third output switch 34 are turned on to charge the third output capacitor 24 using the inductor 10. After the energy in the inductor 10 is transferred completely to the third output capacitor 24, the third output switch 34 is cutoff and the first and second control switches 50, 52 are turned on again to store energy in the inductor 10. When the inductor is filled with energy, the first control switch 50 is cutoff and the second control switch 52 and the second output switch 32 are turned on to charge the second output capacitor 22 using energy in the inductor 10. After the energy in the inductor 10 is transferred completely to the second output capacitor 22, the second output switch 32 is cutoff and the first and second control switches 50, 52 are turned on again to store energy in the inductor 10. When the inductor is filled with energy, the second control switch 52 is cutoff and the first control switch 50 and the fourth output switch 36 are turned on to charge the fourth output capacitor 26 using energy in the inductor 10. After the energy in the inductor 10 is transferred completely to the fourth output capacitor 26, the fourth output switch 36 is cutoff. Because the first output voltage has reached the set value, the first output voltage is not charged any longer. Instead, charging is performed, in the cyclic sequence, to the third output voltage, the second output voltage, the third output voltage, the fourth output voltage, and the third output voltage until the first output voltage is less than the set value. Then the first output capacitor 20 will be charged again, FIG. 5 and FIG. 6 show a circuit diagram and waveforms of the voltage converter when the first and the third output voltages have reached the set value while the others have not according to the present invention. As shown in the figures, the difference between the present embodiment and the previous one is that according to the present embodiment, after the third voltage sensing unit 46 detects that the third output capacitor 24 has finished charging, it will produce the third voltage sensing signal SV3. After the control unit 49 receives the third voltage sensing signal SV3, the third output switch 34 is cutoff, and the first and second control switches 50, 52 are turned on again for charging the inductor 10 again using the power supply $V_{DD}$. When the inductor 10 is tilled with energy, the first control switch 50 is cutoff and the second control switch 52 and the second output switch 32 are turned on to charge the second output capacitor 22 using the inductor 10. Because the first and the third output voltages have reached the set value, the first and the third output capacitors 20, 24 are not charged any longer. Instead, charging is performed, in the cyclic sequence, to the second and the fourth output capacitors 22, 26 until the first or the third output voltage is less than the set value. Then the first or the third output capacitor 20, 24 will be charged again correspondingly.

Figure 7:
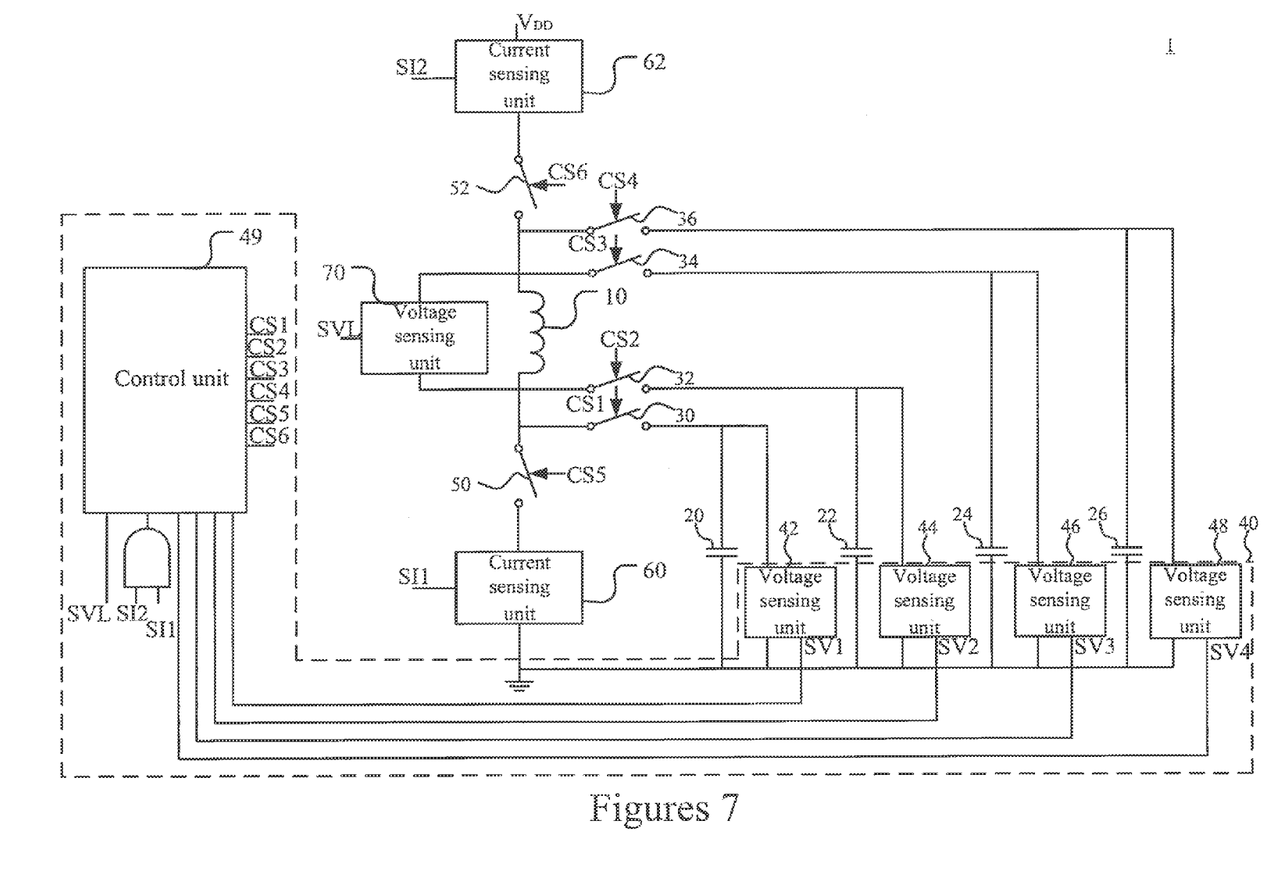
FIG. 7 shows a circuit diagram of the voltage converter when the first, the second, and the third output voltages have reached the set value while the fourth has not according to the present invention.
Figure 8:
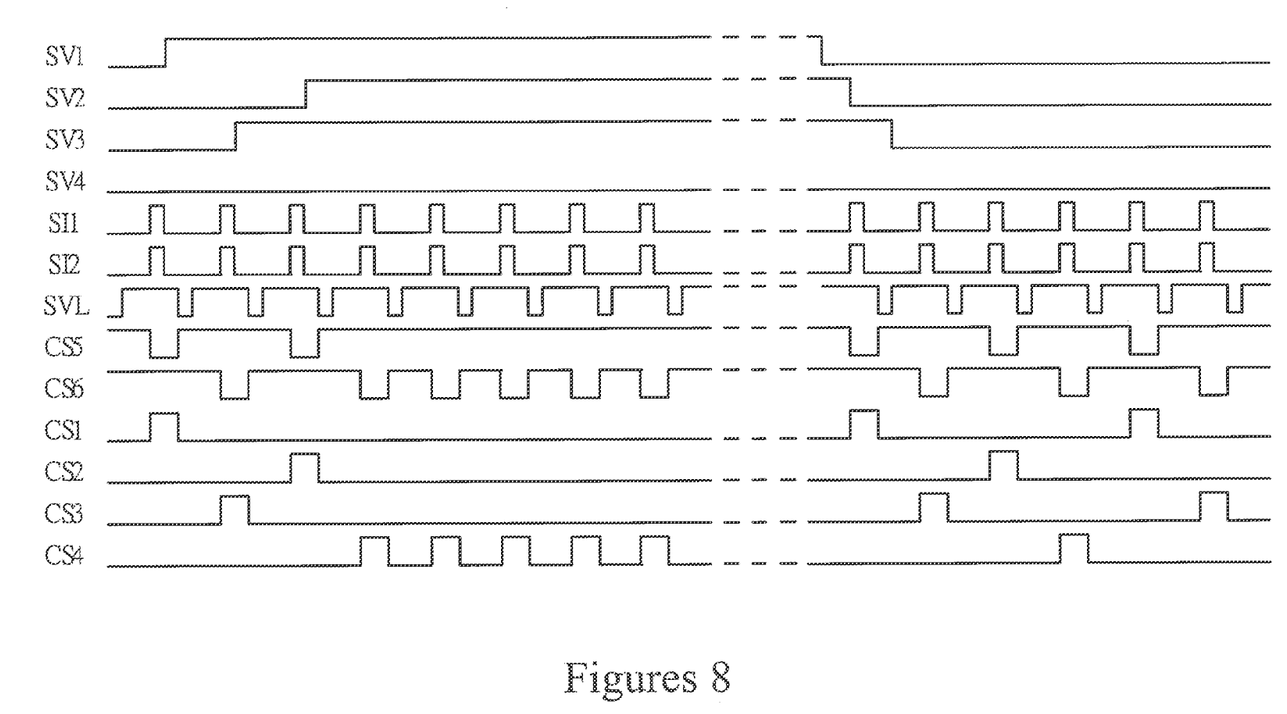
FIG. 8 shows waveforms of FIG. 7 according a the present invention.

FIG. 7 and FIG. 8 show a circuit diagram and waveforms of the voltage converter when the first, the second, and the third output voltages have reached the set value while the fourth has not according to the present invention. As shown in the figures, the difference between the present embodiment and the previous one is that according to the present embodiment, after the second voltage sensing unit 44 detects that the second output capacitor 22 has finished charging, it will produce the second voltage sensing signal SV2. After the control unit 49 receives the second voltage sensing signal SV2, the second output switch 32 is cutoff, and the first and second control switches 50, 52 are turned on again for charging the inductor 10 again using the power supply $V_{DD}$. When the inductor 10 is filled with energy, the second control switch 52 is cutoff and the first control switch 50 and the fourth output switch 36 are turned on to charge the fourth output capacitor 26 using the inductor 10 until the first, the second, or the third output voltage is less than the set value. Then the first, the second, or the third output capacitor 20, 22, 24 will be added to the charging cycle again correspondingly. Otherwise, only the fourth output capacitor 26 will be charged.

Figure 9:
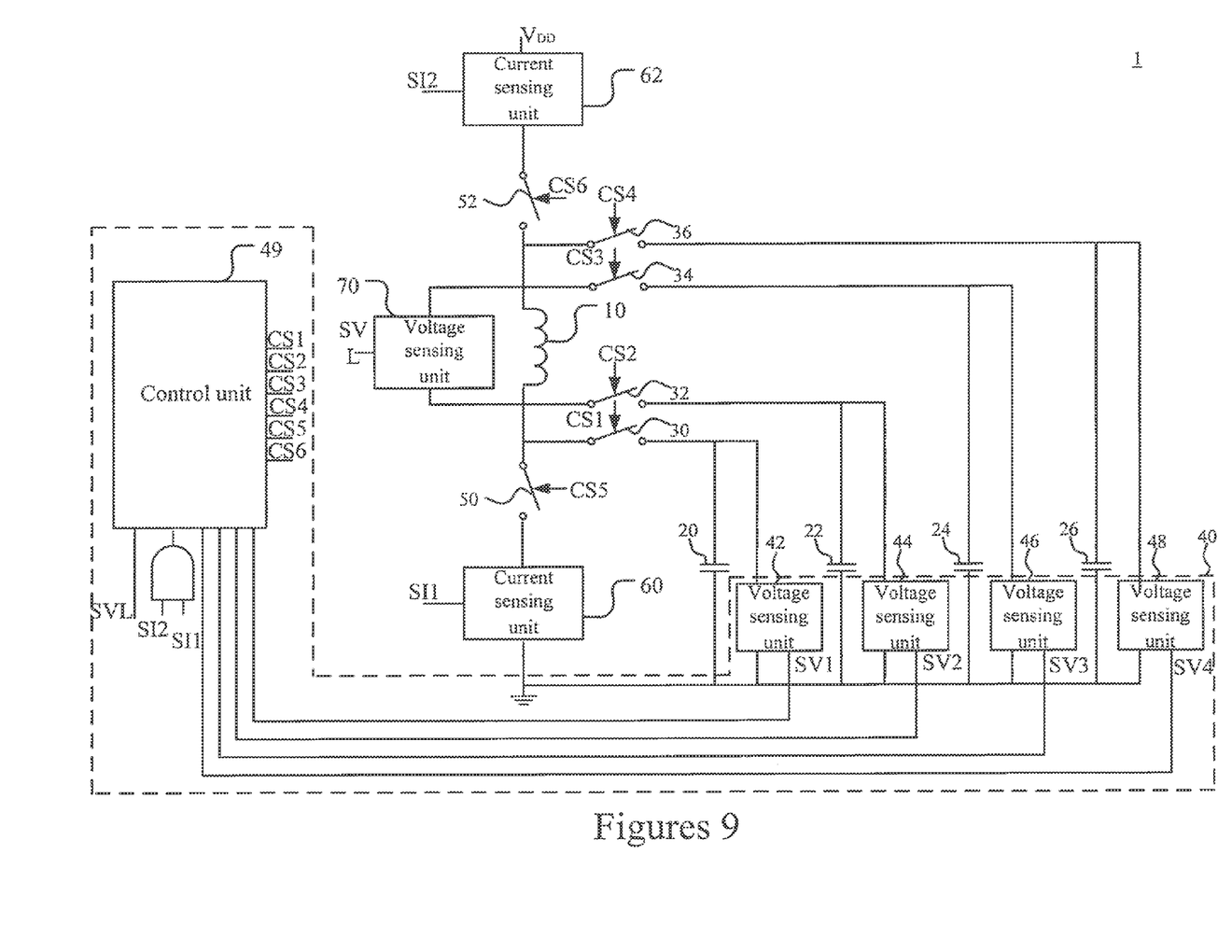
FIG. 9 shows a circuit diagram of the voltage converter when the first, the second, the third, and the fourth output voltages have all reached the set value according to the present invention.
Figure 10:
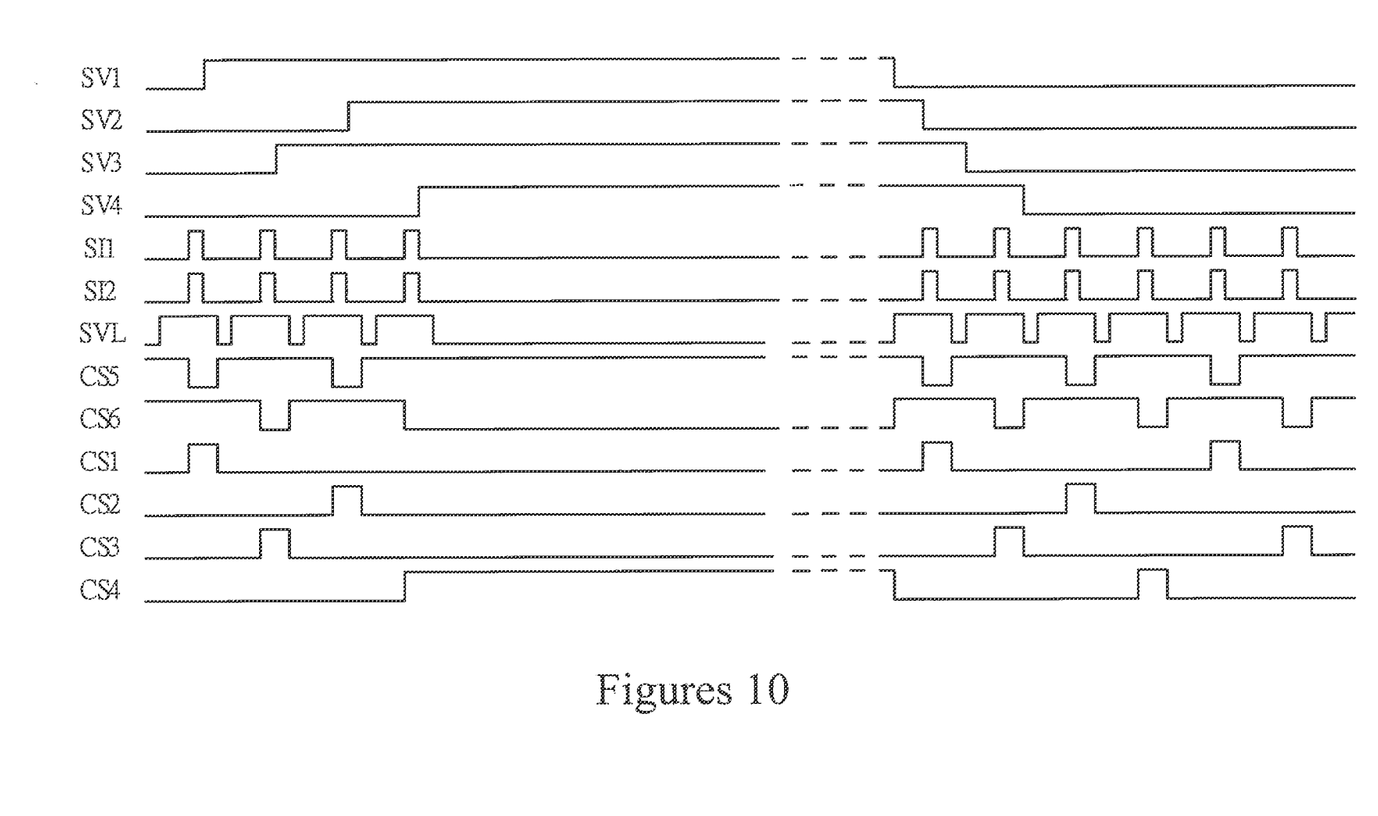
FIG. 10 shows waveforms of FIG. 9 according o the present invention.

FIG. 9 and FIG. 10 show a circuit diagram and waveforms of the voltage converter when the first, the second, the third, and the fourth output voltages have all reached the set value according to the present invention. As shown in the figures, the difference between the present embodiment and the previous one is that according to the present embodiment, after the fourth voltage sensing unit 48 detects that the fourth output capacitor 26 has finished charging, it will produce the fourth voltage sensing signal SV4. After the control unit 49 receives the fourth voltage sensing signal SV4, the fourth output switch 36 is cutoff and complete producing all of the multiple voltages. When the first, the second, the third, or the fourth output capacitor 20, 22, 24, 26 is less than the set value, the charging control will be activated again, in addition, it is known from above that the feedback control circuit 40 turns on the plurality of control switches 50, 52 and the plurality of output switches 30, 32, 34, 36 sequentially according to a timing for controlling the inductor 10 to charge the plurality of output capacitors 20, 22, 24, 26 sequentially, Furthermore, the plurality of control switches 50, 52 and the plurality of output switches 30, 32, 34, 36 are filed-effect transistors (FETs).

Figure 11:
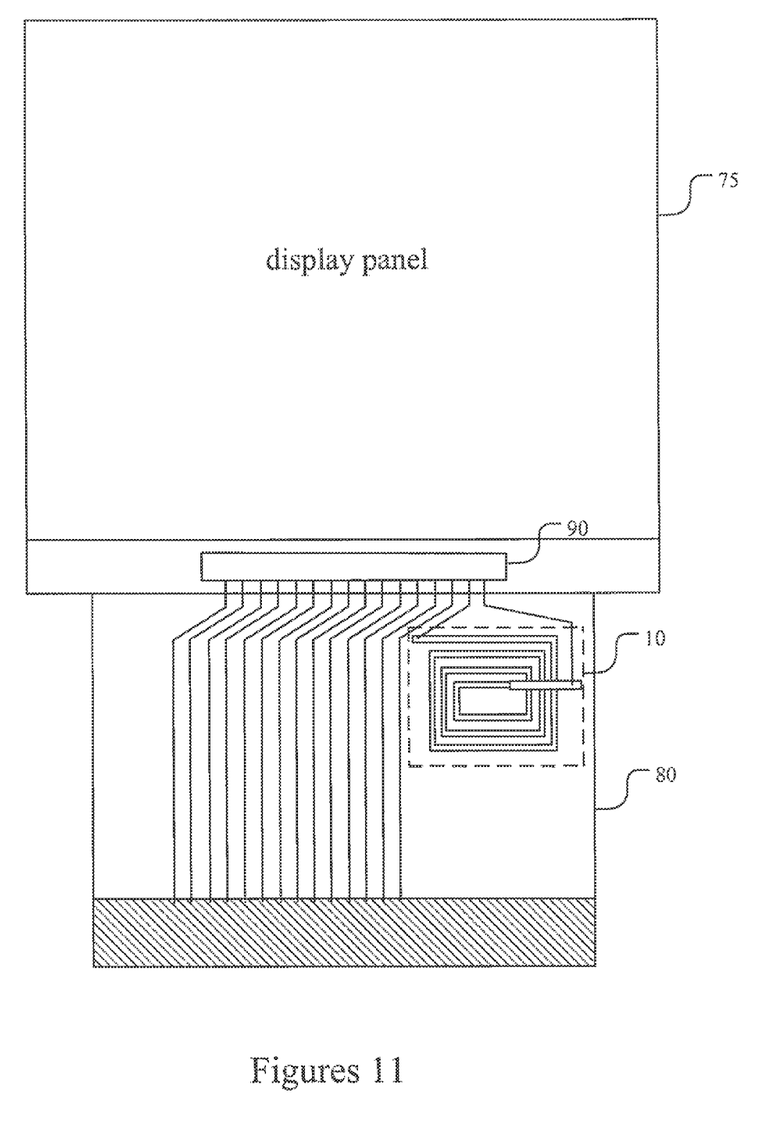
FIG. 11 shows a diagram of an inductor disposed on a flexible circuit board according to the present invention.

FIG. 11 shows the inductor 10 disposed on the flexible circuit board according to the present invention. The voltage converter 1 can be applied for a display panel 75. Further, all elements of the voltage converter 1 can be integrated into a chip 90, or the inductor 10 of the voltage converter 1 is disposed on the outside of the chip 90 and other elements of the voltage converter 1 are integrated into the chip 90. A manner of disposing the inductor 10 on the outsider of the chip 90 can be that an inductance element is disposed on the outside of the chip 90 and is coupled to the pins of the chip 90. However, the inductance element generally has larger size and is solid, so it causes the cost of the circuit increasing while an additional inductance element is required.

Contrast to increment of cost, the present invention provides another manner of disposing the inductor 10, that the inductor 10 is directly formed on a flexible circuit board 80 (such as flexible printed circuit (FPC)). That is, firstly, a metal layer is formed on the flexible circuit board 80, and then the metal layer is etched to form a pattern of the inductor 10. Therefore, the inductor 10 is formed on the flexible circuit board 80. Two terminals of the inductor 10 are coupled to the first control switch 50, the first and second output switches 30, 32, the second control switch 52, and the third and fourth output switches 34, 36 via the pins of the chip 90. Furthermore, the flexible circuit board 80 is a single metal layer circuit board, so the formed inductor 10 would be flat and smaller. Accordingly, the present invention is not required to dispose an additional inductance element due to the inductor 10 is directly formed on the flexible circuit board 80. Further, it achieve the objective of cost saving.

To sum up, the voltage converter according to the present invention uses an inductor coupled between a power supply and a reference voltage for providing a supply voltage. A plurality of output capacitors are coupled to both sides of the inductor, respectively, and receive the supply voltage for producing a positive voltage and a negative voltage. A plurality of output switches are coupled to both sides of the inductor, respectively, and control the inductor to charge the plurality of output capacitors. A feedback control circuit produces a control signal according to the positive and negative voltages for controlling the plurality of output switches. Thereby, the present invention can produce positive and negative voltage by means of the inductor. Accordingly, the voltage converter according to the present invention avoids usage of multiple inductors and capacitors in producing voltages with different levels, and thus reducing the circuit area as well as the manufacturing cost.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A voltage converter, comprising:
   an inductor, coupled between a power supply and a reference voltage for providing a supply voltage;
   a plurality of output capacitors, coupled to both sides of said inductor, respectively, and receiving said supply voltage for producing a positive voltage and a negative voltage;
   a plurality of output switches, coupled to both sides of said inductor, respectively, and controlling said inductor to charge said plurality of output capacitors;
   a voltage sensing unit is coupled to both terminals of said inductor to detects the voltage across said both terminals of said inductor for producing a voltage detecting signal;
   a feedback control circuit, producing a control signal according to said voltage detecting signal, said positive voltage and said negative voltage for controlling said plurality of output switches; and
   a plurality of current sensing units coupled to a plurality of control switches for detecting a current of said plurality of control switches and producing a current sensing signal, said feedback control circuit receiving said current sensing signal and said voltage detecting signal, and controls said plurality of output switches according to said current sensing signal and said voltage detecting signal without requiring another input clock signal for controlling on/off of said plurality of output switches.

2. The voltage converter of claim 1, wherein said feedback control circuit turns on said plurality of output switches sequentially according to a timing for controlling said inductor to charge said plurality of output capacitors sequentially.

3. The voltage converter of claim 1, wherein said feedback control circuit comprises:
   a plurality of voltage sensing units, coupled to said plurality of output capacitors, and producing a voltage sensing signal according to said positive voltage and said negative voltage produced by said plurality of output capacitors; and
   a control unit, coupled to said plurality of voltage sensing units used for producing said voltage sensing signal, and producing said control signal according to said voltage sensing signal.

4. The voltage converter of claim 1, wherein said plurality of control switches are coupled to both sides of said inductor for controlling said power supply to charge said inductor.

5. The voltage converter of claim 4, and further comprising a plurality of current sensing units, coupled to said plurality of control switches, detecting a current of said plurality of control switches, producing a current sensing signal, transmitting said current sensing signal to said feedback control circuit, and said feedback control circuit controlling said plurality of control switches according to said current sensing signal.

6. The voltage converter of claim 4, wherein said feedback control circuit turns on said plurality of control switches and said plurality of output switches sequentially according to a timing for controlling said inductor to charge said plurality of output capacitors sequentially.

7. The voltage converter of claim 4, wherein said plurality of control switches are field-effect transistors.

8. The voltage converter of claim 1, wherein said plurality of output switches are field-effect transistors.

9. The voltage converter of claim 1, wherein the inductor is directly formed on a flexible circuit board, said flexible circuit board is a single metal layer circuit board.

* * * * *